(12) United States Patent
Kano et al.

(10) Patent No.: US 7,493,444 B2
(45) Date of Patent: *Feb. 17, 2009

(54) SUBSTRATE STRUCTURE OF DISK ARRAY APPARATUS, DISK ARRAY APPARATUS AND DISK ARRAY SYSTEM

(75) Inventors: Azuma Kano, Odawara (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 11/508,874

(22) Filed: Aug. 24, 2006

(65) Prior Publication Data

US 2006/0288164 A1    Dec. 21, 2006

Related U.S. Application Data

(63) Continuation of application No. 10/445,490, filed on May 27, 2003, now Pat. No. 7,130,144.

(30) Foreign Application Priority Data

Jun. 14, 2002    (JP) .............................. 2002-174949

(51) Int. Cl.
 G06F 12/00    (2006.01)
(52) U.S. Cl. ...................................... 711/114; 711/112
(58) Field of Classification Search ................. 711/114, 711/112
See application file for complete search history.

(56) References Cited

U.S. PATENT DOCUMENTS

| 5,584,008 | A | 12/1996 | Shimada et al. ............. 711/114 |
|---|---|---|---|
| 5,619,486 | A | 4/1997 | Uno et al. |
| 5,732,238 | A | 3/1998 | Sarkozy ....................... 711/135 |
| 5,877,938 | A | 3/1999 | Hobbs et al. |
| 5,890,214 | A | 3/1999 | Espy et al. ................... 711/114 |
| 6,188,571 | B1 | 2/2001 | Roganti et al. |
| 6,223,250 | B1 | 4/2001 | Yokono ....................... 711/114 |
| 6,341,332 | B2 | 1/2002 | Fujimoto et al. ............. 711/113 |
| 6,408,358 | B1* | 6/2002 | Uchiyama et al. ........... 711/114 |
| 6,574,687 | B1 | 6/2003 | Teachout et al. |
| 6,833,634 | B1 | 12/2004 | Price ........................... 307/18 |
| 7,130,144 | B2* | 10/2006 | Kano et al. ................... 360/69 |

(Continued)

FOREIGN PATENT DOCUMENTS

JP            09006549           1/1997

(Continued)

OTHER PUBLICATIONS

"FCII-Series: Top This. 2 Gbps performance, unmatched scalability and the most feature-ricl FC system on the market", http://www.adts.com/us/presskit/ADTX-FCII.pdg.

*Primary Examiner*—Sheng-Jen Tsai
(74) *Attorney, Agent, or Firm*—Mattingly, Stanger, Malur & Brundidge, PC (57) ABSTRACT

In a substrate structure of a primary disk array apparatus of a disk array system, the primary disk array apparatus contains in one housing at least a plurality of disk drives and a controller substrate with a controller section for controlling the disk drives, and a resource management section that is mounted on the controller substrate of the primary disk array apparatus for managing resources within the housing.

6 Claims, 8 Drawing Sheets

U.S. PATENT DOCUMENTS

| | | | |
|---|---|---|---|
| 2002/0010881 A1 | 1/2002 | White | 714/44 |
| 2002/0069324 A1 | 6/2002 | Gerasimov et al. | 711/114 |
| 2002/0174296 A1 | 11/2002 | Ulrich et al. | |
| 2003/0137987 A1 | 7/2003 | Beer et al. | 370/453 |

FOREIGN PATENT DOCUMENTS

| | | |
|---|---|---|
| JP | 2001216206 | 8/2001 |

* cited by examiner

SUBSTRATE STRUCTURE OF DISK ARRAY APPARATUS, DISK ARRAY APPARATUS AND DISK ARRAY SYSTEM

The present application is a continuation of application Ser. No. 10/445,490, filed May 27, 2003, now U.S. Pat. No. 7,130,144, the contents of which are incorporated herein by reference.

BACKGROUND OF THE INVENTION

1. Field of the Invention

The present invention relates to a substrate structure of a disk array apparatus, a disk array apparatus and a disk array system.

2. Related Background Art

Figure 9:
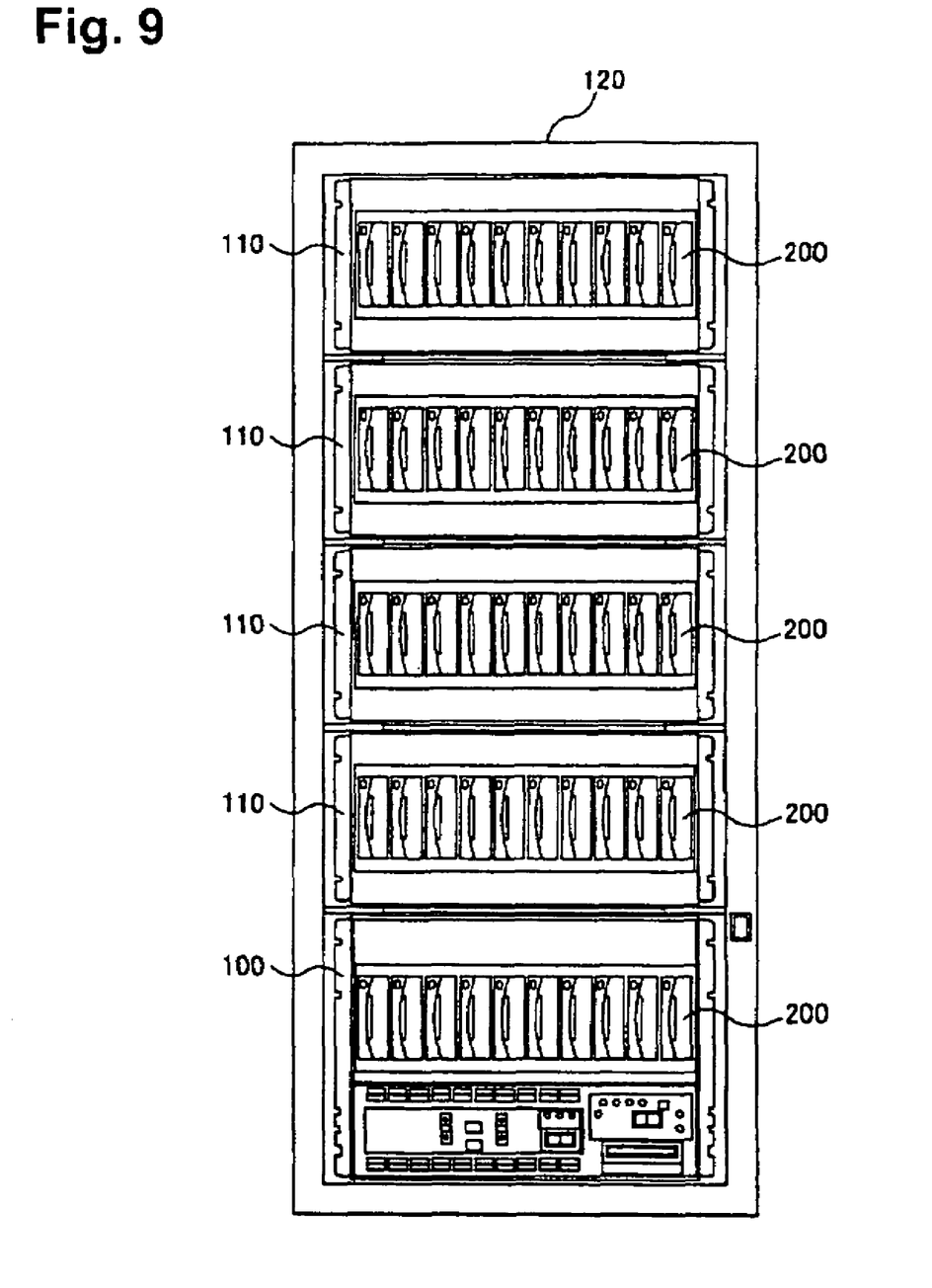
FIG. 9 shows a front view indicating the overall structure of a storage system.

FIG. 9 shows a front view of an example of a conventional rack-mounted disk array system. As indicated in the figure, depending on the performance and/or specification required, the disk array system is equipped with one or more expansion housings (secondary disk array apparatuses) 110 to expand disk drives, in addition to a basic housing (a primary disk array apparatus) 100 that makes up a disk array apparatus. More specifically, a disk array system is structured by containing the basic housing 100 and the expansion housings 110 inside a rack frame 120. The basic housing 100 and the expansion housings 110 are equipped with boards (substrates) and apparatuses that provide various functions of the disk array apparatus.

Conventionally, in addition to a controller module, a resource management section called an enclosure is provided and a dedicated substrate is used to operate the enclosure as a module. The enclosure has several functions, and one of them is a management function to consolidate the control of access to every hard disk drive module in every housing when a disk array apparatus is expanded by adding one or more expansion housings. In other words, the enclosure collects and monitors management information concerning the status of resources, such as every hard disk drive within every housing. The basic housing (the primary disk array apparatus) is equipped with the enclosure (the resource management section) in addition to the controller, but each expansion housing (the secondary disk array apparatus) is required to have only an enclosure (a secondary resource management section) and does not have to have a controller.

Figure 8:
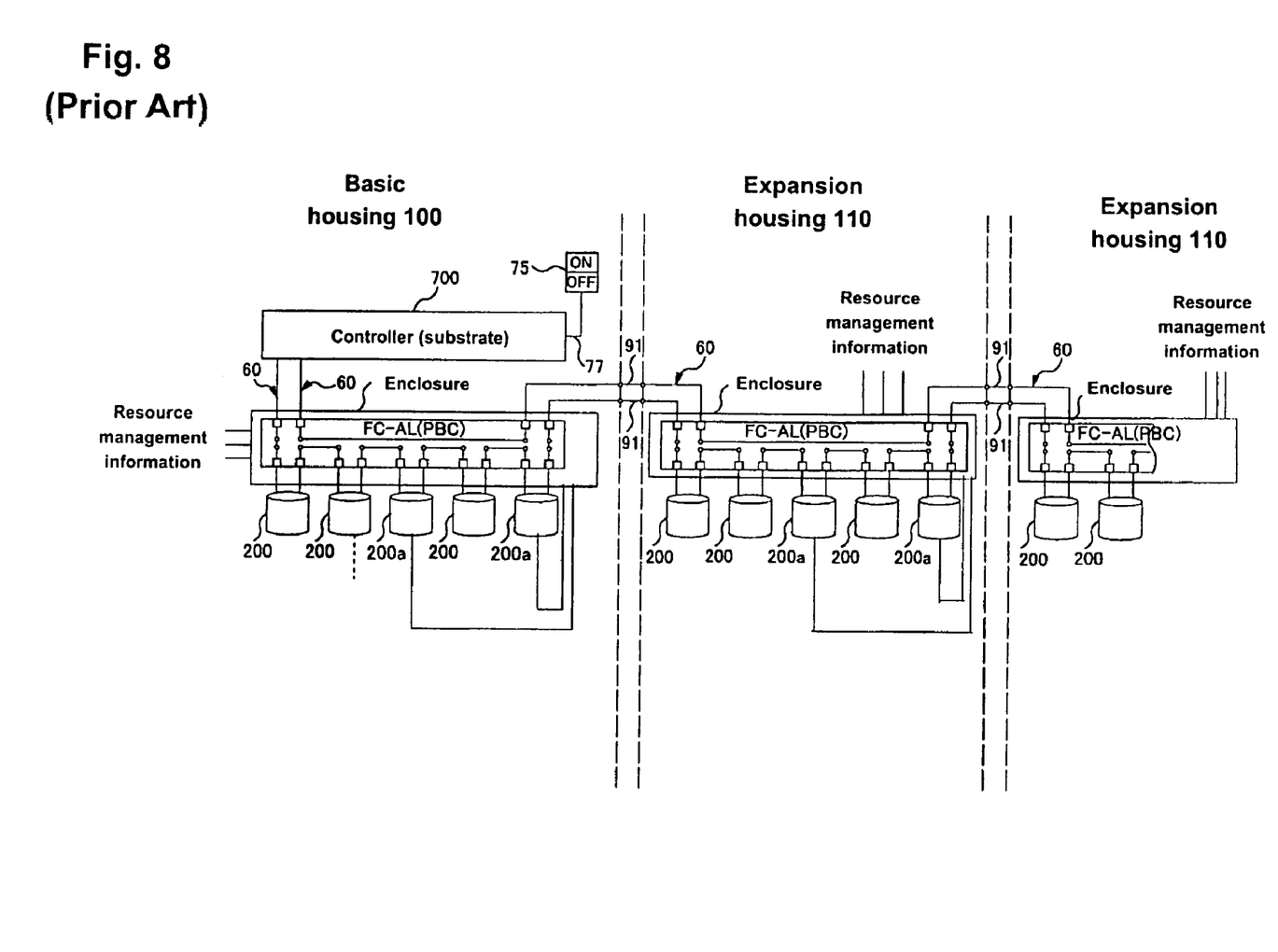
FIG. 8 shows a circuit block diagram of a conventional disk array system.

Specifically, as shown in the block diagram in FIG. 8, the enclosure of the basic housing 100 controls switching Of a Fibre Channel Loop (which is also called Fibre Channel Arbitrated Loop (FC-AL)) between a controller 700 and disk drives 200. A fibre loop switching function of the enclosure is achieved by a port bypass circuit (hereinafter called a "PBC") on a chip. On the other hand, the enclosure (the secondary resource management section) of each expansion housing 110 is connected to the enclosure of the basic housing 100 via a Fibre Channel Loop PBC and lines 60 and 91. This structure allows management information regarding resources such as disk drives 200 of the expansion housings 110 to be collected and monitored.

In addition, the enclosure is wired to be electrically connected to a display lamp device that indicates the operating status of the disk array apparatus, as well as to a power source module and a fan module, which enables the enclosure to obtain data regarding the status of each module and to send control signals to the various modules. In other words, the enclosure has a function to monitor the power source module, a function to control the display lamp device that indicates the operating status of the disk array apparatus, and a function to control the fan module by monitoring the temperature inside each housing. The function to monitor the power source module involves monitoring its running state and on/off control. In FIG. 8, such data and control signals sent to and from each of these modules are indicated as resource management information.

One of the resource management functions of the enclosure of the basic housing 100 and of each expansion housing 110 is to collect data regarding the mounting status of the disk drives 200 and the power source module onto the disk array apparatus, and based on the data to notify the controller of the mounting status.

The various functions of the enclosure described above are achieved by a dedicated LSI, microcomputer or PBC functioning as an enclosure controller section.

Mounting the enclosure of the basic housing 100 in FIG. 8 as a single, independent module has been an impediment to building a smaller disk array apparatus. This is even more true in high-speed transmission such as at 2G bps, where a CDR (clock data recovery) must be added for every few drives in order to maintain waveform quality. Since the number of CDRs that can be added per chip of PBC that realizes the fibre loop switching function is limited, the number of PBCs mounted increases; and this often further impedes the building of a smaller disk array apparatus.

SUMMARY OF THE INVENTION

In a disk array system equipped with a primary disk array apparatus that contains in one housing at least a plurality of disk drives and a controller substrate with a controller section for controlling the disk drives, a substrate structure for the primary disk array apparatus includes a resource management section that is mounted on the controller substrate of the primary disk array apparatus and that manages resources within the housing.

The disk array system may be further equipped with at least one secondary disk array apparatus for expansion, which contains at least a plurality of disk drives contained in a separate housing.

In order to provide redundancy to the resource management section, the primary disk array apparatus may be provided with a substrate having a secondary resource management section mounted thereon to manage resources in the housing anchor the separate housing.

The secondary resource management section of the substrate may be electrically connected to the controller section of the controller substrate, and the secondary resource management section can be controlled by the controller section.

The plural disk drives are mutually connected electrically via a loop and the controller section of the controller substrate is connected to the plurality of disk drives via the loop, which enables the resource management section of the controller substrate to perform switching controls to switch connection relationships among the plural disk drives established via the loop.

The loop can be mounted on a separate substrate as a port bypass circuit on a chip.

The resource management section of the controller substrate may collect data regarding the operating status of the disk array system and may control the turning on and off of a lamp device that indicates the operating status based on the data.

When collecting data regarding the operating status of the disk array system, the resource management section of the controller substrate can collect the data via a predetermined disk drive of the plurality of disk drives.

The resource management section of the controller substrate is electrically connected to the plurality of disk drives and at least to a power source apparatus that supplies power to the disk drives, and the resource management section may collect data regarding the mounting status of the plurality of disk drives and the power source apparatus with respect to the disk array apparatus and, based on the data, may notify the mounting status to the controller section.

The present invention also relates to a disk array apparatus that may include the substrate structure described above.

The present invention further relates to a disk array system that may be equipped with the primary disk array apparatus having the substrate structure described above and the at least one secondary disk array apparatus.

Other problems and solutions disclosed by the present application are made apparent by the preferred embodiments and drawings of the present invention.

PREFERRED EMBODIMENTS

Preferred embodiments are described below. In each of the embodiments described below, matters already explained under the Background of the Invention are omitted to avoid repetition and the primary focus of the description is on parts that concern the features of the present invention.

The Structure of a Disk Array Apparatus

Figure 1:
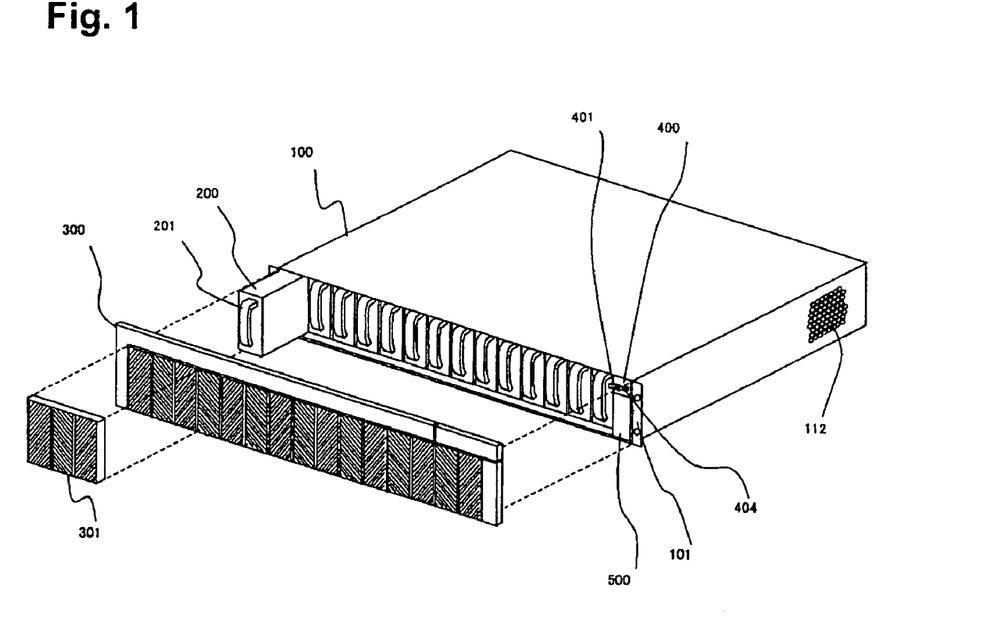
FIG. 1 shows a front perspective view of a disk array apparatus as a basic housing in accordance with one embodiment of the present invention.
Figure 2:
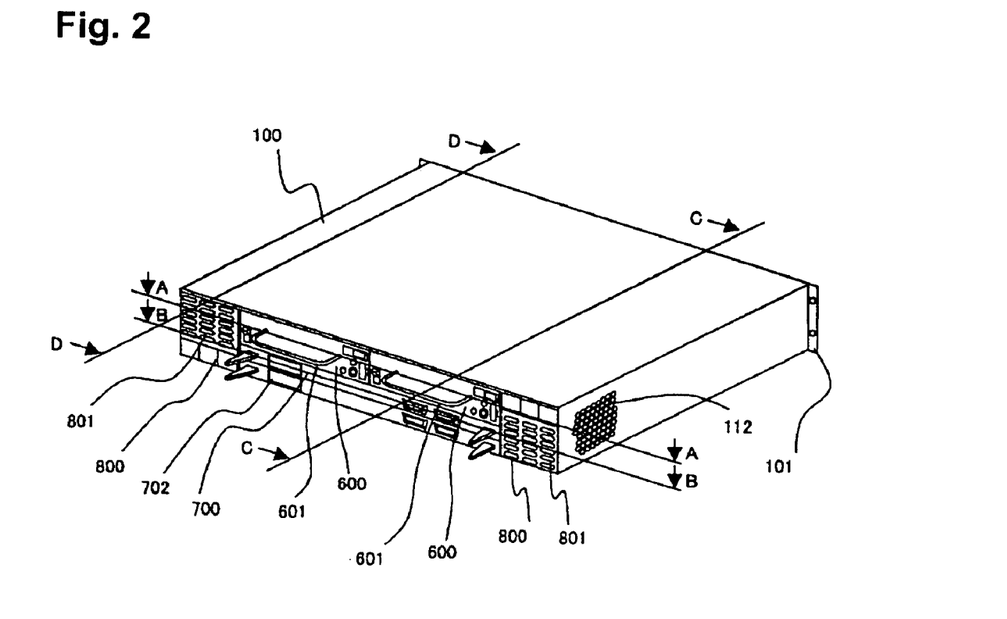
FIG. 2 shows a rear perspective view of a disk array apparatus as a basic housing in accordance with one embodiment of the present invention.

An example of the structure of a disk array apparatus comprising a basic housing is indicated in a front perspective view in FIG. 1 and a rear perspective view in FIG. 2. As shown in FIG. 1, a chassis 100 that comprises the basic housing has a front cover 300 with ventilation attached thereto in a detachable manner. Louvers 301, each in a unit of three columns, are fitted to the front cover 300 in a detachable manner.

Hard disk drive modules 200 (hereinafter called the "HDD modules") are arranged and positioned in a detachable manner in sequence from the left in a front opening section of the chassis that comprises the basic housing 100. Each HDD module 200 can be detached by grabbing and pulling a handle part 201. Each HDD module 200 may be provided with a 3.5 in. (approximately 88.9 mm) disk inside as a recording medium, and the disk is positioned in such a way that the direction of the diameter of the disk is the height direction. The chassis 100 may store 14 HDD modules 200, for example, on the front opening section.

Furthermore, in the first column on the right side of the front opening section of the chassis 100 are stored a module 400 for operation panel (hereinafter called the "operation module") and a module 500 for battery (hereinafter called the "battery module"). The battery module 500 has a secondary battery that may be built in the module and it is placed at the front of the chassis 100 to make periodic replacement and service easy.

When the disk array apparatus is viewed from left rear as shown in FIG. 2, the chassis 100 has a rear surface section that is open with a fan module 800 placed in a detachable manner at either end of the opening. The fan modules 800 cool the interior of the chassis 100. At the rear surface section of each of the fan modules 800 are provided slits 801 for exhaust, and heat is discharged through the slits 801. Air is taken into the interior of the chassis 100 through the front cover 300 and discharged through the rear section of the chassis 100 by the fan modules 800.

As shown in FIG. 2, two modules 600 for power source (hereinafter called the "power source modules") are placed between the fan modules 800. Under the power source modules 600 are placed two modules 700 and 702 for controller (i.e., controller section) (hereinafter called the "controller modules"), one on top of the other. The power source modules 600 and the controller modules 700 and 702 are detachable. The fan modules 800, the power source modules (power source apparatuses) 600 and the controller modules 700 and 702 do not have to be in sets of two, and the disk array apparatus can operate with one unit of each. The controller modules 700 and 702 are modules that control the disk array system in the RAID, for example, and have mounted on each of them a circuit substrate (a controller substrate) that realizes such control functions.

Figure 5:
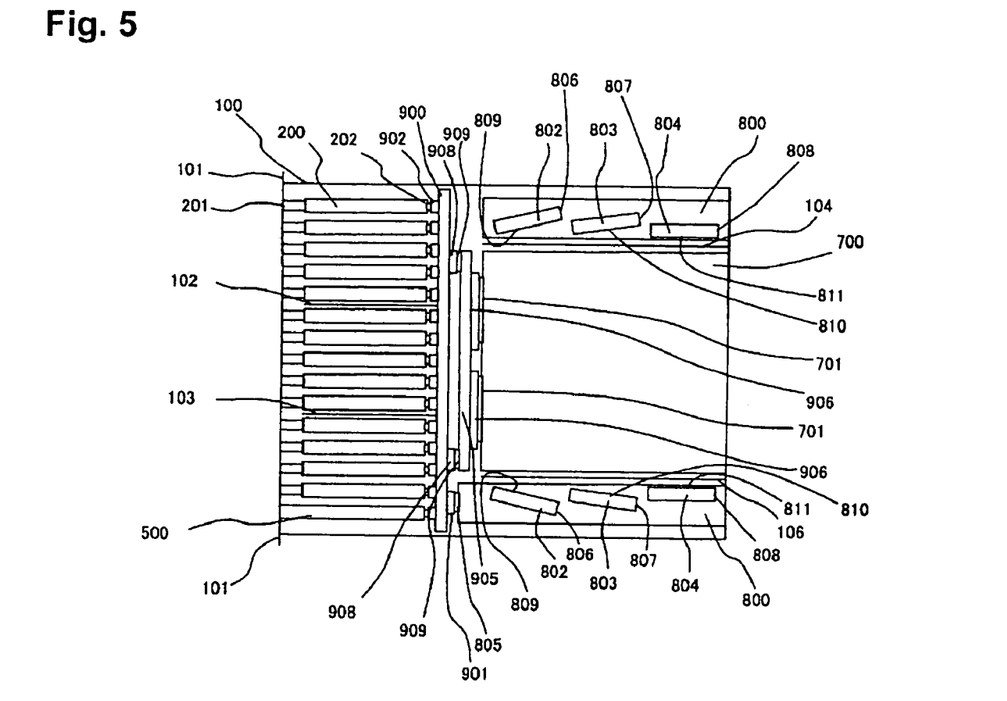
FIG. 5 schematically shows a cross section of the internal structure of the disk array apparatus taken along a line B-B in FIG. 2.
Figure 7:
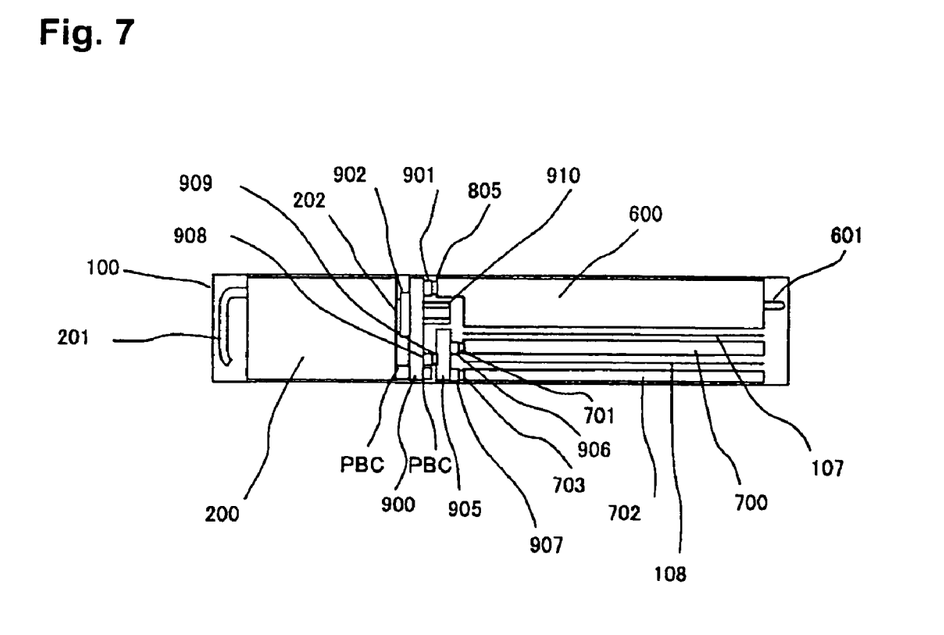
FIG. 7 schematically shows a cross section of the internal structure of the disk array apparatus viewed from the side, taken along a line C-C in FIG. 2.

Next, an internal structure of the disk array apparatus will be described below. FIG. 5 schematically shows a cross section of the overall internal structure of the disk array apparatus taken along a line B-B in FIG. 2. FIG. 7 schematically shows a cross section of the overall internal structure of the disk array apparatus viewed from the side taken along a line C-C in FIG. 2. A partition substrate 900 called a backboard is provided adjacent to the back of the HDD modules 200 in the chassis 100. To the rear of the partition substrate 900 is provided another backboard 905 that is used to connect with the controller module 700. Hereinafter, the backboard towards the front of the chassis 100 is called a front backboard 900, and the backboard to which the controller module 700 is connected is called a rear backboard 905. The rear backboard 905 is provided with connectors 906, which connect with connectors 701 of the controller module 700. The front backboard 900 and the rear backboard 905 are mutually linked via connectors 908 and 909.

The controller module 700 is mounted in a detachable manner in the rear of the chassis 100. Inside the controller module 700 is a controller substrate provided with a CPU, a memory and cache. In addition, the controller module 700 is provided with an enclosure function to manage the expansion of the disk array apparatus. The controller module 700 is connected to every module inside the disk array apparatus via the rear backboard 905 and thereby controls and manages every module.

The HDD modules 200 are placed on the front opening section of the chassis 100 and connected to the front backboard 900. The power source modules 600 are placed at the top of the rear opening section of the chassis 100, while the controller modules 700 and 702 are placed at the bottom. The power source modules 600 are connected to the front backboard 900, while the controller modules 700 and 702 are connected to the rear backboard 905.

The front backboard 900 and the rear backboard 905 are mutually connected by the connectors 908 and 909. The exchange of information between the front backboard 900 and the rear backboard 905 takes place via the connectors 908 and 909.

The backboards 900 and 905 are fixed to backboard fixing frames to form a backboard assembly 912. On the rear backboard 905 are placed connectors 906 and 907 to connect with the two controller modules 700 and 702. The connectors 906 are connectors to connect with the controller module 700, and the connectors 907 are connectors to connect with the controller module 702. The controller modules 700 and 702 share cache data and must be able to transfer data with each other at high speed. The connectors 906 and 907 are placed in such a way that the positions of the two pairs' mutually corresponding pins are vertically aligned on the rear backboard 905. This allows the length of the pattern wiring on the rear backboard 905 between the pins to be the shortest possible length. This in turn makes possible a high-speed data transfer between the controller modules 700 and 702, thereby allowing the controller modules 700 and 702 to share the cache.

Figure 4:
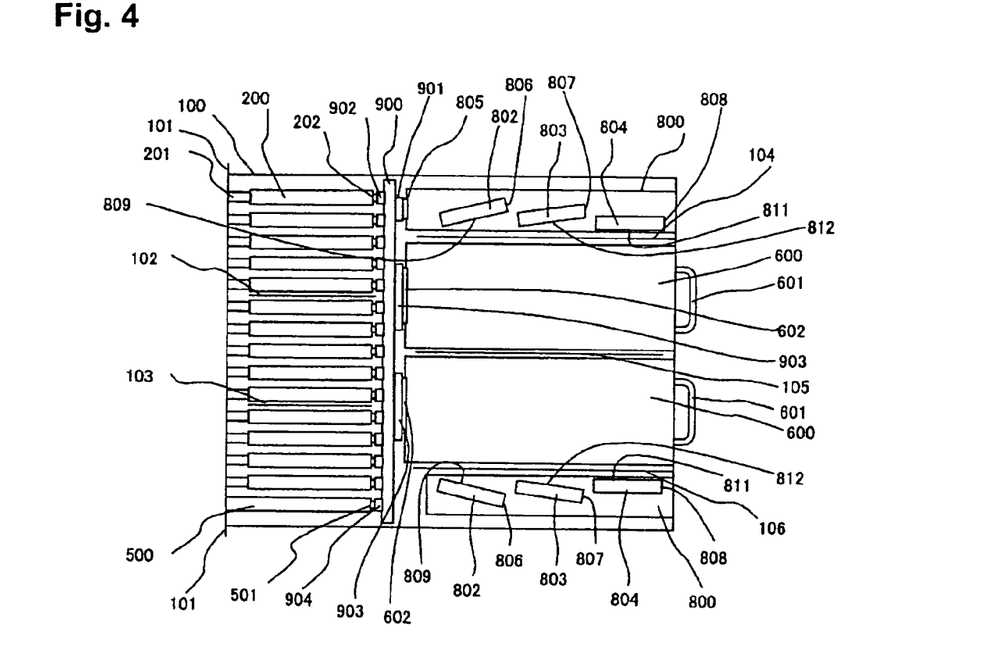
FIG. 4 schematically shows a cross section of the internal structure of the disk array apparatus taken along a line A-A in FIG. 2.

FIG. 4 indicates a cross section of the overall interior structure of the disk array apparatus viewed from above, taken along a line A-A in FIG. 2. On the front backboard 900 are placed connectors 903, which make the two power source modules 600 connectable, and connectors 901, which make the two fan modules 800 connectable. The fan module 800 mounted on the right side of the chassis 100 and the fan module 800 mounted on the left side of the chassis 100 may be identical. For this reason, the connectors 901 used to connect the fan modules 800 are placed differently from each other when the fan modules are placed on the left and right sides of the front backboard 900.

First Embodiment

In accordance with a first embodiment of the present invention, an enclosure section (a resource management section) 13 is mounted on a substrate for a controller (a controller section) (hereinafter called the "controller substrate") 700 of a disk array apparatus (a primary disk array apparatus) of the basic housing 100 as shown in a block diagram in FIG. 3, such that the functions of the enclosure are integrated on a controller module. This makes it possible to eliminate a substrate dedicated to an enclosure and a module for such a substrate, thereby making it possible to realize a smaller disk array apparatus and a disk array system.

More specifically, a controller section 12, which controls a RAID disk array system and has host controller functions, and the enclosure section 13, which has drive controller functions, are integrated on one controller module (substrate) 700. As the host controller section, the controller section 12 controls data input/output with an external host. As the drive controller section, the enclosure section 13 monitors and controls the operating status of every disk drive in every housing, as described earlier.

To make input and output of data with the host possible, the controller section 12 and the HDD modules 200 are connected by a Fibre Channel Loop. In the meantime, in order to make it possible for the enclosure section 13 to collect management information regarding the HDD modules 200, two resource management drives 200a for SES (SCSI enclosure service) and the enclosure section 13 are connected via a predetermined interface. The interface is in accordance with a standard called "SFF8067," for example, and is called an ESI (enclosure service I/F).

In order to realize functions of the host controller section, an LSI called a fibre protocol chip (FPC) and a peripheral circuit (S/P, serial-parallel conversion circuit) may be mounted on the controller substrate 700. In order to realize functions of the enclosure section 13 that includes the drive controller section, an LSI, a microcomputer and a PBC may be mounted on the controller substrate 700. The LSI may have a function to manage information regarding resources and a function concerning the ESI's hardware aspect. The microcomputer may be in charge of various controls in addition to the ESI's software aspect. The PBC may controls the switching of the Fibre Channel Loop (FC-AL, Fibre Channel Arbitrated Loop) as a control of a drive bypass.

To simplify the description of an embodiment of the present invention in terms of its technological concept, an example in which there is one controller (module) in the basic housing (i.e., a single controller method) has been described, but the present invention can be applied to a structure with two controllers (a dual controller method). The objective of the dual controller method is to provide redundancy in the functions of the controller and the enclosure and to secure reliability of a disk array apparatus by providing redundant controller modules. In other words, as shown in FIG. 6, the two controller substrates (controller substrates 700) of the basic housing 100 can each be provided with an enclosure section with shared functions.

Second Embodiment

In the first embodiment, the primary focus is to realize the controller section 12 and the enclosure section 13 in one module. However, redundancy is lost for both the controller section 12 and the enclosure section 13 in the single controller method. For this reason, in the present embodiment a module that has only the enclosure section 13 mounted on a substrate is prepared in order to secure redundancy for the enclosure section 13, which acts as an important drive controller section. This makes it possible to improve reliability.

Figure 6:
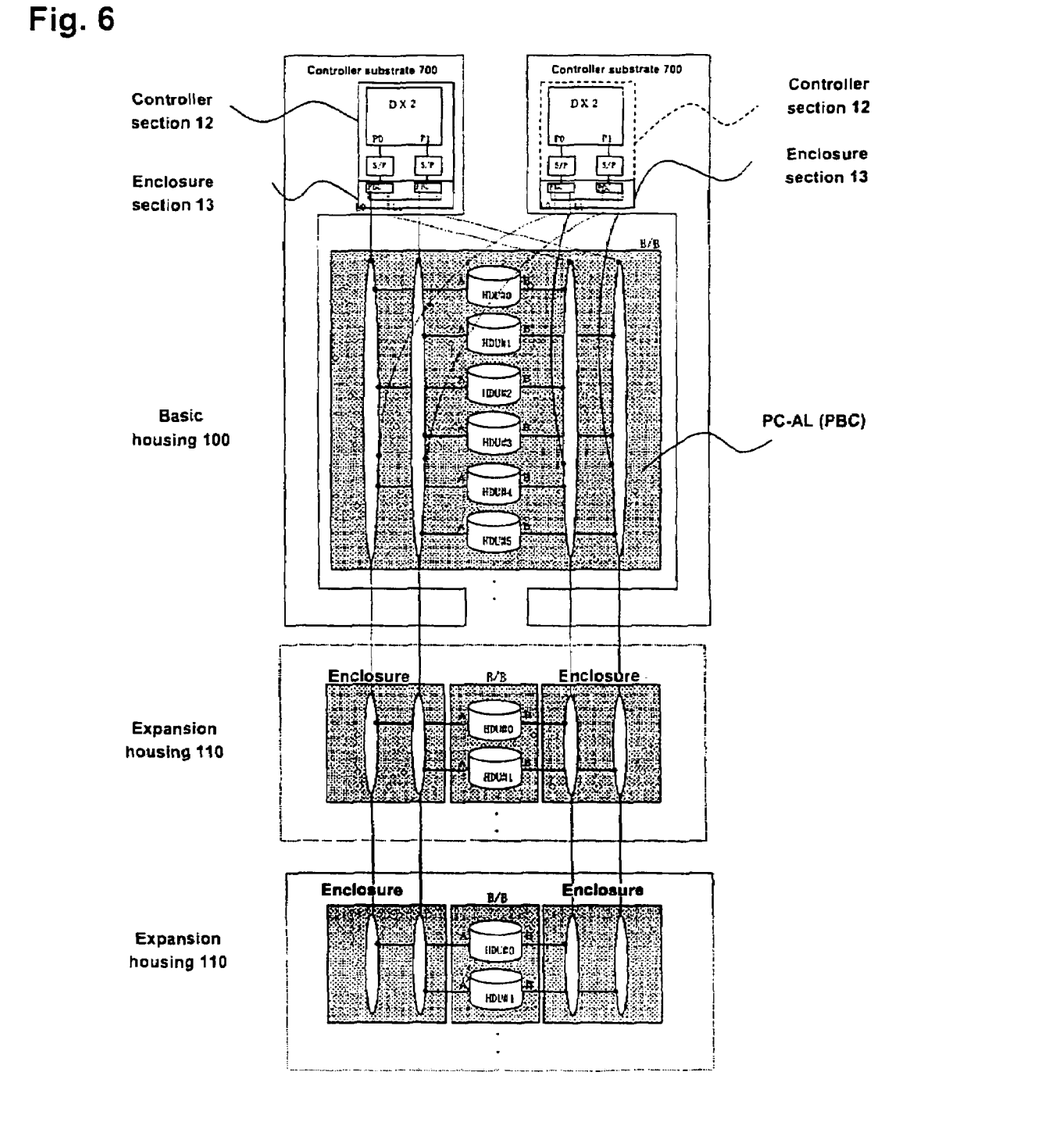
FIG. 6 shows a circuit block diagram of a dual controller method disk array system in accordance with one embodiment of the present invention.

FIG. 6 shows, as the basic structure, a circuit block diagram of a disk array system, in which the first embodiment is applied to a dual controller method. The controller section 12 surrounded by a broken line is eliminated from the controller (module) substrate 700 on the right side in the figure, thus essentially creating a single controller method and leaving only the enclosure section 13 on the controller (module) substrate 700 on the right side in the figure.

With this structure, in the event a failure occurs in one of the enclosure sections 13, the other enclosure section 13 can take over and secure the functions of the enclosure section 13.

More specifically, in the dual controller method shown in FIG. 6, PBCs of the enclosure sections 13 of the two controllers substrates 700 of the basic housing 100 are mutually connected. The structure is altered to the single controller method while maintaining the connection relations. In other words, the part surrounded by a broken line (which corresponds to the controller section 12 in the figure) is not mounted on one of the controller substrates 700 to eliminate one of the controller sections 12, and this forms an enclosure board comprising only the enclosure section 13. This results in the enclosure sections 13 having redundancy, in spite of the single controller method used.

The enclosure sections 13 of what was originally a dual controller method are mutually connected via PBCs. In other words, in the dual controller method shown in FIG. 6, the PBCs of the enclosure sections 13 on the two controller substrates 700 are connected via a Fibre Channel Loop (FC-AL) mounted on a backboard (i.e., a separate substrate indicated by "B/B" in the figure) and resource management drives connected to the loop. Consequently, it becomes possible to control the enclosure section 13 of the other enclosure board from the controller section 12 of the controller board 700.

As a result, a shared control becomes possible from the controller section 12 in a single controller method with two controller boards or in a dual controller method.

Third Embodiment

Next, a description will be made as to the mounting of the PBCs that realize a Fibre Channel Loop (PC-AL), which is a component of an enclosure section mounted on a controller substrate of a basic housing. A description will be made as to an example in which the PBCs cannot be contained on one controller substrate and are instead mounted on a partition substrate called a backboard (BIB). FIG. 6 shows a block circuit diagram of the present embodiment and FIG. 7 shows its cross-sectional view taken along a line C-C in FIG. 2.

As shown in FIG. 7, the HDD modules 200 are placed on the front opening section of the chassis 100 and connected to the front backboard 900. The power source modules 600 are placed at the top of the rear opening section of the chassis 100, while the controller modules 700 and 702 are placed at the bottom. The power source modules 600 are connected to the front backboard 900, while the controller modules 700 and 702 are connected to the rear backboard 905. The front backboard 900 and the rear backboard 905 are mutually connected by the connectors 908 and 909. The exchange of information between the front backboard 900 and the rear backboard 905 takes place via the connectors 908 and 909.

Figure 3:
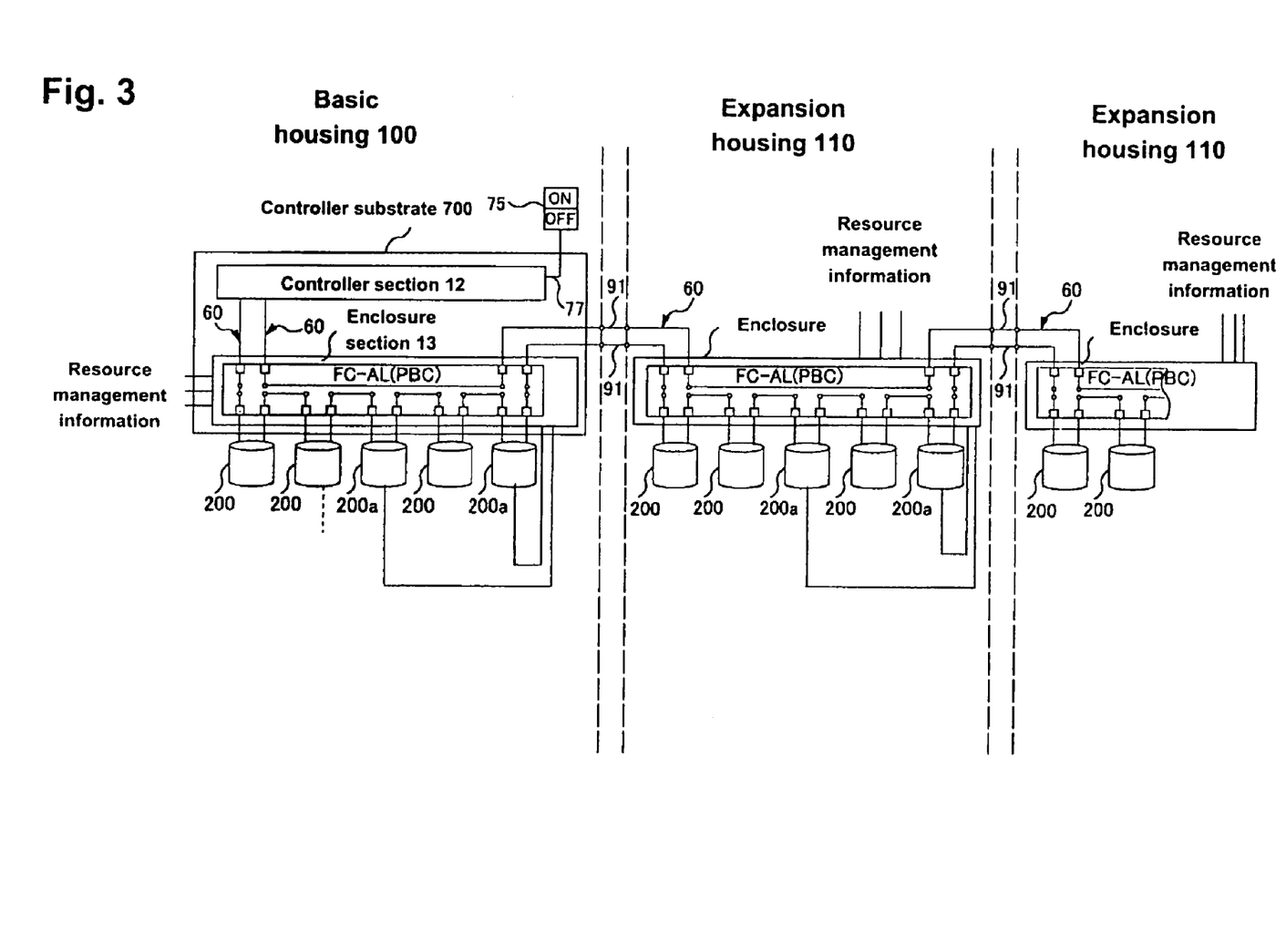
FIG. 3 shows a circuit block diagram of a disk array system in accordance with one embodiment of the present invention.

As described in the first embodiment with reference to FIG. 3, the Fibre Channel Loop, which is a component of the enclosure section, is realized as PBCs in terms of mounting. The PBCs are mounted on a backboard instead of a controller substrate in order to meet a demand for a smaller basic housing. In the block circuit diagram in FIG. 6, a Fibre Channel Loop (PBCs) on a backboard represented as BIB is indicated.

A cross-sectional view shown in FIG. 7 indicates that PBCs are mounted on unoccupied areas of the mounting surface of the backboard 900, i.e., PBCs are mounted to utilize free areas that are not in the way of other modules or substrates. As indicated by "PBC" in the figure, PBCs are provided on both sides of the backboard 900 from the perspective of mounting, PBC functions and mounting efficiency.

Through such a mounting structure, an enclosure substrate (module) is eliminated to make the basic housing smaller; furthermore, the PBCs, which act as a Fibre Channel Loop, of the enclosure sections 13 mounted on the controller substrates (modules) 700 are mounted in free areas of the corresponding backboard 900. This allows the controller substrates 700 to be even smaller and contributes to a smaller basic housing. As a result, the disk array apparatus as a basic housing and the disk array system can be made smaller while securing the redundancy of the enclosure sections.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk array system comprising:
    a controller being coupled to at least one host computer and conducting to store data sent from said host computer to one or more storage regions based on Redundant Array of Independent Disks (RAID) procedure;
    a port bypass circuit;
    a loop being coupled to said controller, via said port bypass circuit, and being used to relay data sent from said controller to said storage regions;
    a plurality of disk drive modules each having a disk drive for recording data, said hard disk drive modules being coupled to said loop and having said storage regions and storing said data sent from said controller;
    at least one power supply module being coupled to said disk drive modules and said controller and supplying power to said disk drive modules and said controller;
    a resource management circuit being coupled to said controller and collecting information which indicates whether one or more of said disk drive modules are coupled to said loop and sending a notice of said information to said controller;
    a controller module having said controller, said port bypass circuit and said resource management circuit on one module which is coupled to said disk drive modules;
    a plurality of fan modules having respective fans that cool the disk drive modules, the controller module and the power supply module;
    a chassis having said controller module, said power supply module and a back plane, which is coupled to said controller module, said power supply module and said fan modules;
    another controller being coupled to said host computer and conducting to store data sent from said host computer to said storage regions based on said RAID procedure instead of said controller, if said controller fails;
    another port bypass circuit,
    wherein said loop being coupled to said another controller, via said another port bypass circuit, and said disk drive modules and being used to relay data sent from said another controller to said storage regions,
    wherein said power supply module being coupled to said another controller and supplying power to said another controller;
    another resource management circuit being coupled to said another controller and collecting another information which indicates whether one or more of said disk drive modules are coupled to said loop and sending a notice of said another information to said another controller;
    another controller module having said another controller, said another port bypass circuit and said another resource management circuit on one module which is coupled to said disk drive modules; and
    another plurality of fan modules module having respective fans that cool the another power supply module and the another controller module,
    wherein said chassis includes said controller module, said another controller module, said power supply module and said back plane, which is coupled to said controller module, said another controller module and said power supply module,
    wherein said controller and said another controller are different from each other, and
    wherein said another port bypass circuit is mutually connected to said port bypass circuit and each are controlled in a manner such if a failure occurs in said controller module, then said another controller takes over and secures functions of said controller module.

2. A disk array system according to claim 1, wherein said controller module is constructed by a single substrate.

3. A disk array system according to claim 1, wherein said another controller module is constructed by a single substrate.

4. A disk array system according to claim 1, wherein a cache memory is coupled to said controller and temporarily stores said data sent from said host computer, and wherein said chassis further includes said cache memory.

5. A disk array system according to claim 1, wherein another cache memory is coupled to said another controller and temporarily stores said data sent from said host computer, and wherein said chassis further includes said another cache memory.

6. A disk array system according to claim 1, further comprising:

another chassis having another plurality of disk drive modules and a another loop which is coupled to said loop, and wherein said resource management circuit collects further another information which indicates whether one or more of said another disk drive modules are coupled to said another loop and sends a notice of said further another information to said controller.

* * * * *